United States Patent [19]

Lamb

[11] Patent Number: 5,140,666
[45] Date of Patent: Aug. 18, 1992

[54] HEATING APPARATUS FOR EXPANDING A CYLINDRICAL WALL USING HEATED AIR

[76] Inventor: James E. Lamb, 4664 Clearwater Dr., Memphis, Tenn. 38128

[21] Appl. No.: 614,851

[22] Filed: Nov. 16, 1990

[51] Int. Cl.$^5$ .......................... H05B 1/00; F24H 3/12; F27B 17/00
[52] U.S. Cl. ........................ 392/382; 29/447; 34/97; 34/104; 34/105; 34/243 R; 392/360; 392/365
[58] Field of Search .................. 392/379–385, 392/360–368; 29/447; 34/96–100, 104–106, 243 R

[56] References Cited

U.S. PATENT DOCUMENTS

| | | | |
|---|---|---|---|
| 2,023,861 | 12/1935 | Stienen | 34/104 X |
| 3,427,434 | 2/1969 | Gassaway | 29/447 X |
| 3,513,564 | 5/1970 | Gramprie . | |
| 3,560,709 | 2/1971 | Crane et al. | 29/447 X |
| 3,599,345 | 8/1971 | Tolmie | 392/383 X |
| 3,706,824 | 12/1979 | Huber et al. | 34/104 |

FOREIGN PATENT DOCUMENTS 149758 4/1955 Sweden .................. 34/104

*Primary Examiner*—Anthony Bartis
*Attorney, Agent, or Firm*—Wood, Phillips, Van Santen, Hoffman & Ertel

[57] ABSTRACT

An apparatus for heating the inner cylindrical wall of a device, such as a bearing, gear, sprocket, coupling, sleeve, or the like, for expanding the cylindrical wall to facilitate the installation of the device on a receiving element includes a source of heated air coupled to an elongated cylindrical air distributor having an outer diameter small than the inner diameter of the cylindrical wall. Adjustable supports position and align the air distributor and the device to allow distributor to be inserted into the device with their central axes substantially coaxially aligned so that an annular space is created therebetween into which heated air is communicated from the distributor through a plurality of opening on the distributor. Annular baffles on the distributor close the opposite sides of the annular space while allowing exhaust of sufficient heated air to prevent undesired pressure buildup in the space.

6 Claims, 3 Drawing Sheets

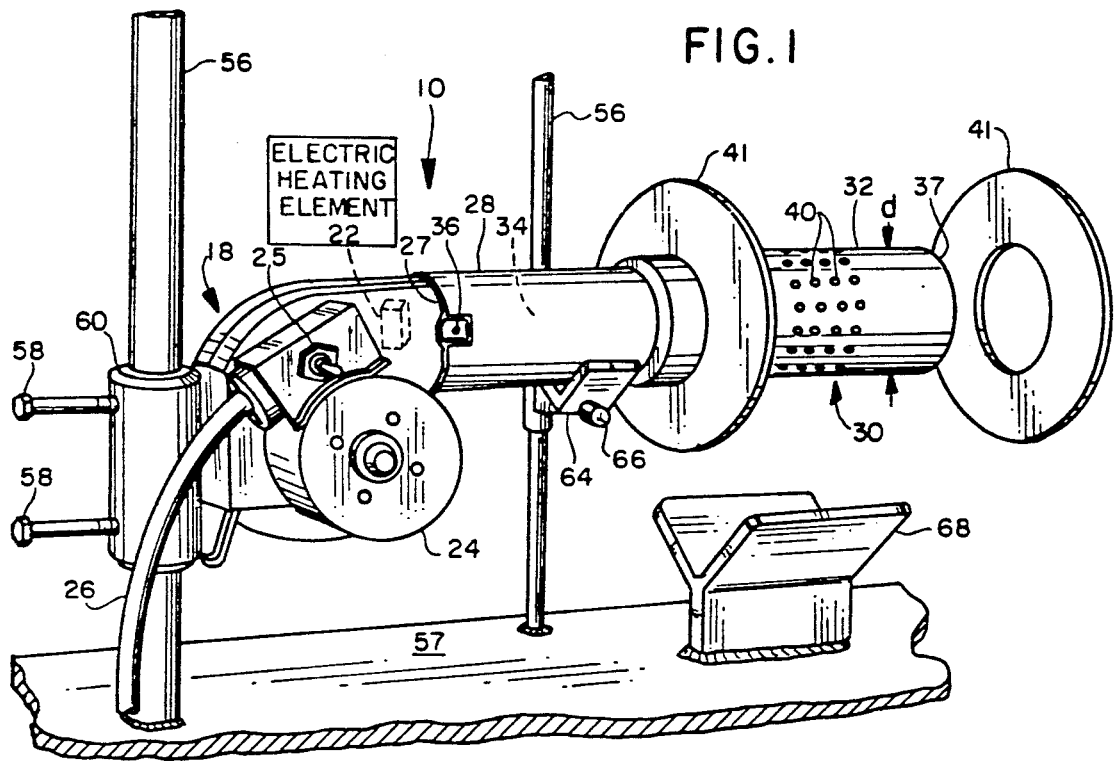
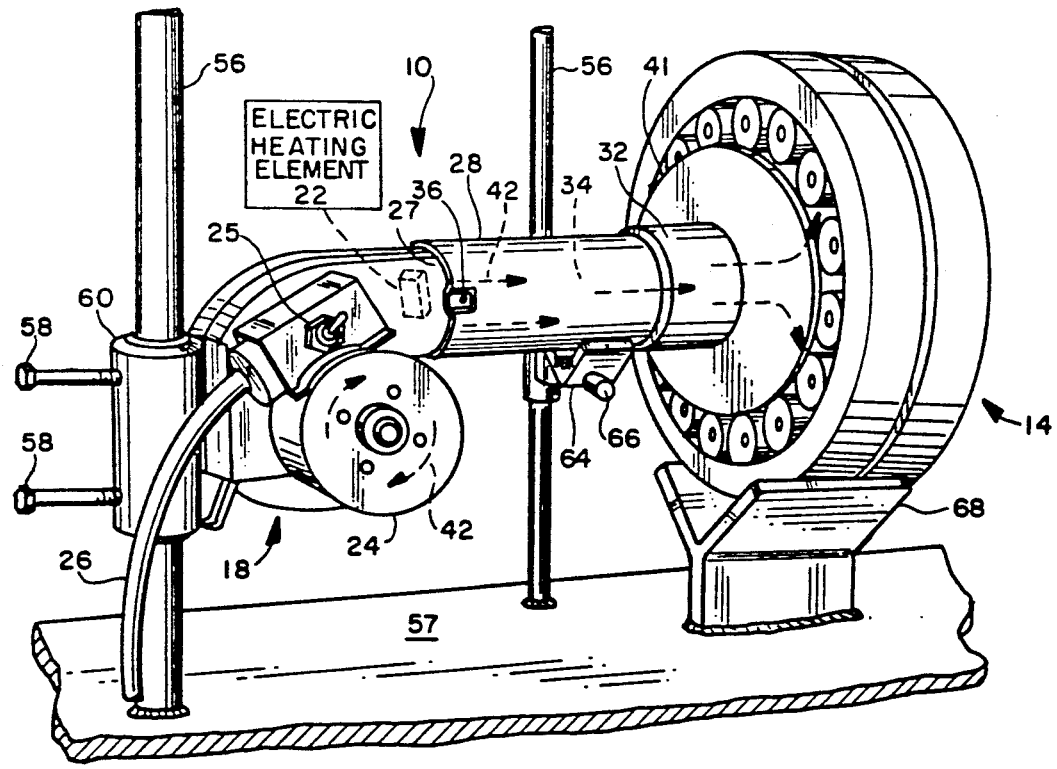

HEATING APPARATUS FOR EXPANDING A CYLINDRICAL WALL USING HEATED AIR

TECHNICAL FIELD

The present invention relates to a heating apparatus, and more particularly, to an apparatus that heats the inner cylindrical wall of a device to facilitate the installation of the device on a receiving element.

BACKGROUND ART

It is often desirable to install a device having an inner cylindrical wall on a receiving element, such as a bearing on a shaft, with the cylindrical wall having an inner diameter substantially the same as the outer diameter of the shaft. Typically, this is accomplished by heating the device so that the area of the inner cylindrical wall expands and thereafter placing the device on the receiving element where it contracts. One method to heat the inner cylindrical wall of the device is to hang the device on a conducting bar so that one portion of the inner cylindrical wall rests on the conducting bar and the remaining portion is spaced away. A heat source generates and conducts heat through the conducting bar which conducts the heat through the inner cylindrical wall of the device. There are problems with this, however. Because part of the inner cylindrical wall rests on the bar and the remaining portion is spaced away from the bar, the conducting bar does not conduct heat evenly to the inner cylindrical wall and thus the area in the inner cylindrical wall does not expand uniformly. As a result, the shape of the inner cylindrical wall may become distorted resulting in awkward installation.

Additionally, the device must be constantly rotated to assure that the entire inner cylindrical wall is heated, thus requiring the operator's constant attention.

Additionally, it takes a considerable amount of time and energy to conduct the heat from the heat source to the conducting bar and then to conduct the heat from the conducting bar to the inner cylindrical wall of the device.

The present invention is directed toward overcoming one or more of the problems as set forth above.

SUMMARY OF THE INVENTION

In one aspect of the present invention, an apparatus to heat an inner cylindrical wall of a device such as a bearing, gear, sprocket, coupling, sleeve or the like to facilitate the installation of the same on a receiving element is provided with a source of forced heated air. An air distributor is coupled to the heat source and comprises a peripheral wall defining a chamber to receive the forced air. The peripheral wall has an outer area smaller than the area of inner cylindrical wall to receive the device with a generally annular space being defined therebetween The heat source forces the heated air into the chamber of the air distributor and out through a plurality of holes in the peripheral wall of the air distributor and into the annular space between the peripheral wall and cylindrical wall of the device. The forced heated air causes the inner cylindrical wall to expand and thus increase the inner diameter of the inner cylindrical wall of the device to facilitate the installation of the device on the receiving element.

One advantage of the present invention is that the inner diameter of the inner cylindrical wall is increased evenly to permit simple installation of the device on the receiving element and to prevent any slippage therebetween.

Another advantage of the present invention is that it eliminates any need to rotate the device during the heating of the same, thus eliminating the continuous attention of the operator.

Still another advantage of the present invention is that it reduces the amount of time and energy needed to heat the device as the heated air directly heats the inner cylindrical wall of the device.

BRIEF DESCRIPTION OF THE DRAWINGS

FIG. 1 is a perspective view of the heating apparatus;

FIG. 3 is a perspective view of the heating apparatus in use with the heated device, such as a bearing, disposed thereon;

DESCRIPTION OF THE PREFERRED EMBODIMENT

Figure 2:
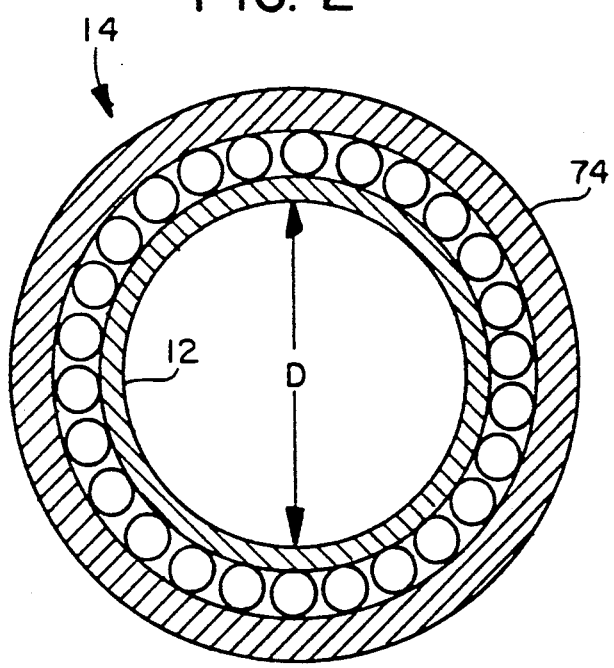
FIG. 2 is a plan view of a device to be heated, such as a bearing.

An apparatus 10 for heating an inner cylindrical wall 12 of a device 14 such as a bearing, gear, sprocket, coupling, sleeve or the like in order to facilitate the installation of the same on a receiving element 16, is shown in the figures. The device 14 in the form of a bearing is shown in FIG. 2. Although the figures show a bearing, the device is not limited to such and can include any device that has an inner cylindrical wall.

Looking at FIG. 1, the apparatus 10 includes a source of heated air 18 such as a conventional heat gun having a heating element 22, fan 24, an activating switch 25, wires 26 and an outlet 27.

An extension tube 28 is coupled to the heat source 18 by conventional means 36 such as nuts and bolts or a screw. An air distributor 30 is slidably mounted on the extension tube 28 and is retained thereon by a friction fit. The air distributor includes a peripheral wall 32 that is closed at one end as shown at 37 that defines a chamber 34 to receive the heated air from the heat source 18. Additionally, the peripheral wall 32 has a plurality of uniformly spaced openings 40 for which purpose will be discussed in detail below.

It should be noted that the use of the extension tube 28 is optional. Alternatively, the air distributor 30 can be directly secured to the heat source 18 by any conventional means. Also, the heat gun 18 itself can be of such dimension, i.e. length, so that no extension tube or heat distributor is needed. That is, the heat gun would perform the function of a heat source and air distributor. Finally, the heat source 18 is not limited to a heat gun, but can be of any type as long as heat is forced into the air distributor.

Figure 4:
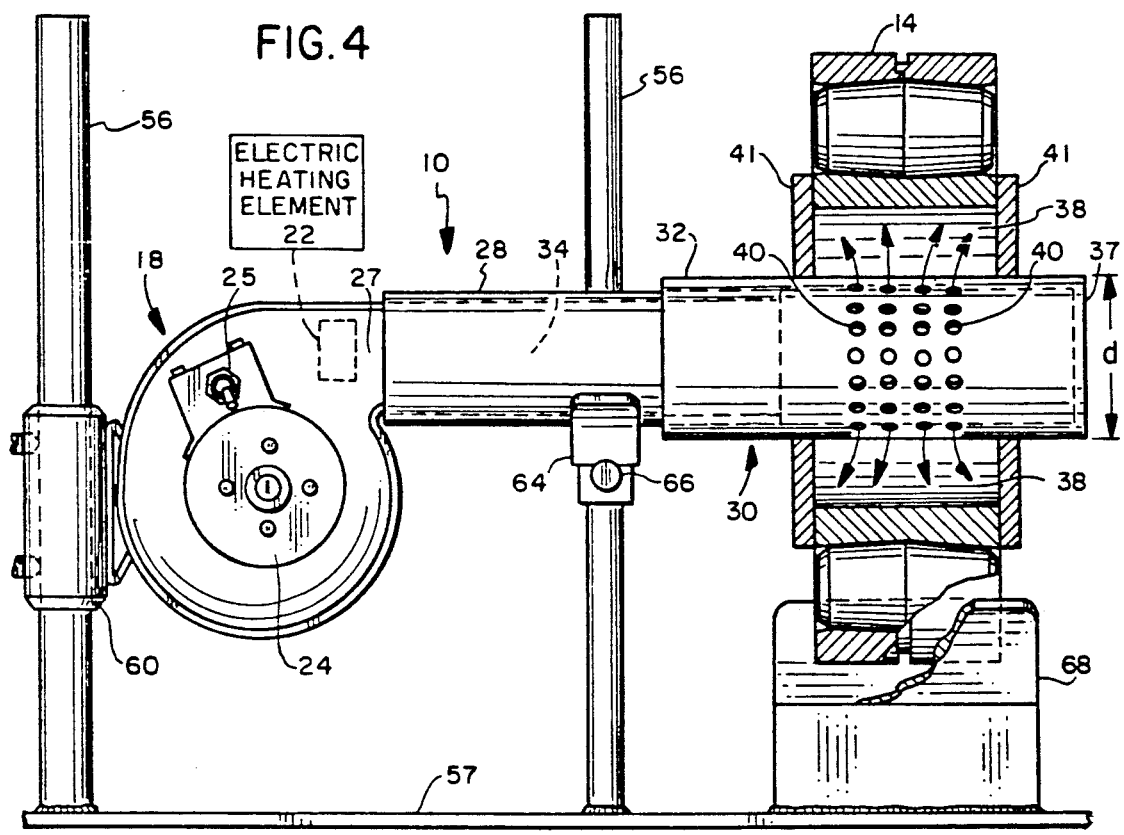
FIG. 4 is a side view, partly in section, showing the inner cylindrical wall of the device being heated.

In use, the device 14 is placed on the air distributor 30 over the openings 40. As shown in FIGS. 1 and 2, the peripheral wall 32 of the air distributor 30 has a diameter 'd' which is smaller than the diameter "D" of the inner cylindrical wall 12 of the device 14 so that the device 14 can be received on the peripheral wall 32 of the air distributor 30 as shown in FIGS. 3 and 4. Also, as shown in FIG. 4, the relative diameters of the inner cylindrical wall 12 and the peripheral wall 32 are such that when the device 14 is placed on the peripheral wall 32, a generally annular space 38 is defined therebetween. Baffles 41 are disposed on the peripheral wall 32 on opposite sides of the device 14 for reasons discussed below.

To begin the heating operation, switch 25 is activated and heat source 18 generates forced air (shown in arrows 42 in FIG. 3) which the fan 24 forces past heating element 22 and into the chamber 34 of air distributor 30. Looking at FIG. 4, the forced heated air travels through the chamber 34 of the air distributor 30 and out through the spaced openings 40 and into the annular space 38 disposed between the peripheral wall 32 and the inner cylindrical wall 12 of the device 14. Because the openings 40 are uniformly spaced around the entirety of the peripheral wall 32, the heated air 20 is distributed evenly and thus heats the entire inner cylindrical wall 12 thereby causing the inner cylindrical wall to expand and to evenly increase the diameter of the inner cylindrical wall 12.

Also, looking at FIGS. 1 and 3, during the heating operation, the baffles 41 maintain the heated air within the annular space 38 between the peripheral wall 32 of the air distributor and cylindrical wall 12 while allowing heated air forced into the annular space 38 to exhaust sufficiently to prevent an undesired pressure buildup in the space.

The heat source 18 and air distributor 30 can be disposed in various positions depending on the size of the device 14 to be heated. More specifically, the apparatus 10 is slidably mounted on mounting bars 56 which are secured to a platform 57. Screws 58 extend through a slidable housing 60 which is secured to the air distributor 30 by conventional means. Screws 58 are rotated through the housing and against mounting bars 56 to secure the housing and thus the heat source 18 and air distributor 30 thereto. Additionally, the air distributor 30 is supported by supports 64 by a screw 66. The device 14 itself is supported above the platform 57 by a support 68 rigidly secured to platform 67. As can be seen, the apparatus 10 can be easily positioned at different elevations to accommodate the different sized devices.

Figure 5:
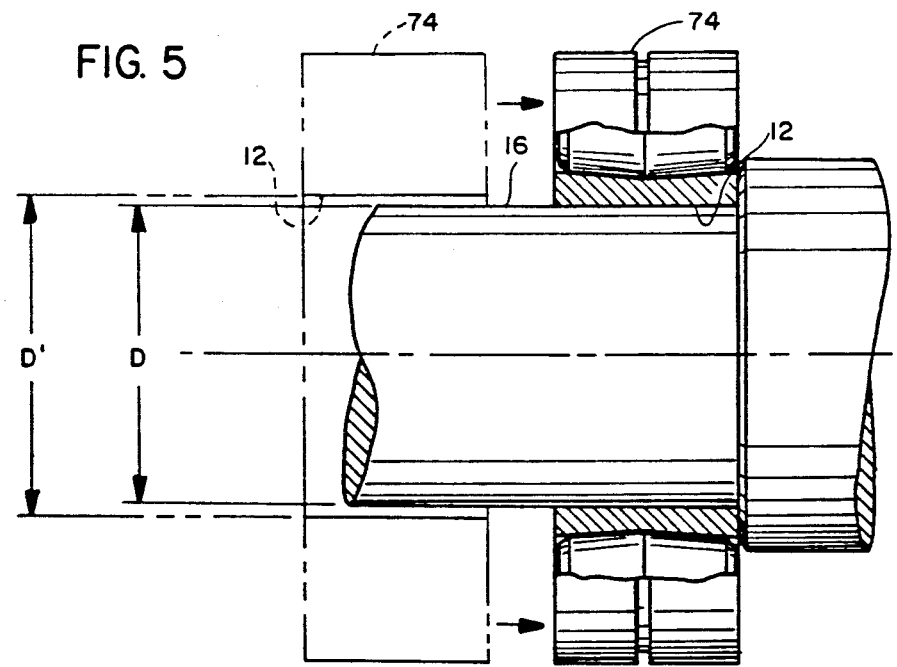
FIG. 5 is a side view, partly in section, showing the heated device being installed on a receiving element, such as a shaft.

After the heating operation, the heated device 14 is removed from the peripheral wall 32 of the air distributor 30 and is placed on a receiving element such as a shaft 16, as shown in FIG. 5. As clearly shown immediately after heating and when initially installing the device 14 on the shaft 16, the inner cylindrical wall 12 of the device 14 has an increased inner diameter D' as shown in phantom in FIG. 5. After the device 14 is placed on the shaft 16, the inner cylindrical wall 12 cools and the inner diameter contracts to its original dimension D to fit snugly around the shaft 16 to prevent any slippage therebetween. It should be noted, that during the heating operation, only the inner cylindrical wall of the device 14 expands and contracts as the outer portion 74 of the device 14 does not change in shape or dimension. Thus, immediately after heating, the device can be placed on a shaft within a housing the overall size of the device always remains constant.

As can be appreciated from the foregoing, any device having an inner cylindrical wall can be simply heated and easily installed on a receiving element quickly and accurately while maintaining the original shape of the device and without requiring the constant attention of the operator.

Other aspects, objects and advantages of the invention can be obtained from a study of the drawings, the specification and the appended claims.

I claim:

1. An apparatus to heat an exposed, radially inwardly facing surface on a cylindrical wall of a device such as a bearing, gear, sprocket, coupling, sleeve, or the like, which radially inwardly facing surface has a first central axis and axially spaced ends and defines a receiving space for a cylindrical element to be in coaxial relationship with the cylindrical wall, said apparatus comprising:

a source of forced, heated air;

an air distributor comprising a peripheral wall defining an internal air chamber and having an outer peripheral surface with a second central axis and a diameter that is less than the diameter of the radially inwardly facing surface on the cylindrical wall of the bearing, gear, sprocket, coupling, sleeve, or the like;

means for supporting the air distributor and bearing, gear, sprocket, coupling, sleeve, or the like, in operative relationship with the first and central axes in substantially coaxial relationship so that there is an annular space defined between the radially inwardly facing surface on the cylindrical wall of the bearing, gear, sprocket, coupling, sleeve, or the like and the outer peripheral surface of the peripheral wall of the air distributor;

means for communicating forced, heated air from said source into the air distributor chamber, there being a plurality of openings through the wall of the air distributor wall to communicate heated air from said air distributor chamber to the annular space;

annular baffle means surrounding the air distributor and extending radially with respect to the peripheral air distributor wall to beyond the annular space at each axial end of the bearing, gear, sprocket, coupling, sleeve, or the like to confine the forced heated air principally within the annular space; and means for allowing heated air forced into the annular space to exhaust sufficiently to prevent an undesired pressure buildup in said annular space, whereby forced heated air causes the cylindrical wall to expand to facilitate reception therein of a cylindrical element in coaxial relationship with the cylindrical wall.

2. The apparatus of claim 1 wherein said supporting means comprises a base, a support for the air distributor and a bearing, gear, sprocket, coupling, sleeve, or the like, and means for selectively varying the relative positions of the support and air distributor along a line transverse to the first and second central axes.

3. The apparatus of claim 1 wherein the openings in the air distributor wall are spaced around the periphery of the air distributor peripheral wall to effect an even distribution of air into said annular space.

4. The apparatus of claim 1, wherein the support for a bearing, gear sprocket, coupling, sleeve, or the like comprises an upwardly opening, U-shaped seat to receive a bearing, gear, sprocket, coupling, sleeve, or the like.

5. The apparatus of claim 1 wherein the baffle means includes a first baffle on the air distributor at one axial end of a bearing, gear, sprocket, coupling, sleeve, or the like mounted thereon.

6. The apparatus of claim 1 wherein the baffle means includes a removable baffle on the air distributor at one axial end of a bearing, gear, sprocket, coupling, sleeve, or the like mounted thereon.

* * * * *